(12) United States Patent
Eibelhuber et al.

(10) Patent No.: US 10,656,078 B2
(45) Date of Patent: May 19, 2020

(54) METROLOGY DEVICE AND METROLOGY METHOD

(71) Applicant: EV Group E. Thallner GmbH, St. Florian am Inn (AT)

(72) Inventors: Martin Eibelhuber, Ried im Innkreis (AT); Markus Heilig, Neuburg a. Inn (DE); Boris Povazay, Vienna (AT)

(73) Assignee: EV Group E. Thallner GmbH, St. Florian am Inn (AT)

( * ) Notice: Subject to any disclaimer, the term of this patent is extended or adjusted under 35 U.S.C. 154(b) by 11 days.

(21) Appl. No.: 16/068,386

(22) PCT Filed: Feb. 17, 2016

(86) PCT No.: PCT/EP2016/053327
§ 371 (c)(1),
(2) Date: Jul. 6, 2018

(87) PCT Pub. No.: WO2017/140353
PCT Pub. Date: Aug. 24, 2017

(65) Prior Publication Data
US 2019/0025194 A1    Jan. 24, 2019

(51) Int. Cl.
*G01N 21/17* (2006.01)
*G01H 9/00* (2006.01)
(Continued)

(52) U.S. Cl.
CPC ........... *G01N 21/1702* (2013.01); *G01H 9/00* (2013.01); *G01N 21/1717* (2013.01);
(Continued)

(58) Field of Classification Search
CPC .............. G01B 11/0666; G01B 11/161; G01N 21/1702; G01N 21/1717; G01N 21/45;
(Continued)

(56) References Cited

U.S. PATENT DOCUMENTS 4,139,302 A * 2/1979 Hung ................... G01B 11/161
356/32
4,180,324 A * 12/1979 Primbsch ........... G01N 29/2418
356/35.5
(Continued)

FOREIGN PATENT DOCUMENTS

CN       1727874 A      2/2006
JP       H04-81654 A    3/1992
(Continued)

OTHER PUBLICATIONS

International Search Report from corresponding International Patent Application No. PCT/EP2016/053327, dated Nov. 14. 2016.

*Primary Examiner* — Michael A Lyons
(74) *Attorney, Agent, or Firm* — Kusner & Jaffe (57) ABSTRACT

A metrology device includes a sound sample holder and an optical system. The sound sample holder is provided for applying sound waves to a first substrate stack surface of the substrate stack. The optical system include a source, a lens field, a beam splitter, and a detector. The source is provided for outputting electromagnetic radiation, which is split into at least one first beam path and one second beam path. The lens field is provided for applying the first beam path to a substrate stack measuring surface of the substrate stack. The beam splitter is provided for forming an interference radiation made up of the first and second beam paths of the electromagnetic radiation. The detector is provided for detecting the interference radiation.

11 Claims, 6 Drawing Sheets

(51) Int. Cl.
  *G01N 29/24* (2006.01)
  *G01N 21/88* (2006.01)
  *G01N 21/45* (2006.01)

(52) U.S. Cl.
  CPC ..... *G01N 21/8806* (2013.01); *G01N 29/2418* (2013.01); *G01N 21/45* (2013.01); *G01N 21/88* (2013.01); *G01N 2021/1706* (2013.01)

(58) Field of Classification Search
  CPC .............. G01N 21/88; G01N 21/8806; G01N 29/2418; G01N 2021/1706; G01N 2291/0231; G01H 9/00; G01H 9/008
  See application file for complete search history.

(56) References Cited

U.S. PATENT DOCUMENTS

| | | | | |
|---|---|---|---|---|
| 6,008,887 | A * | 12/1999 | Klein | G01H 9/00 |
| | | | | 356/28.5 |
| 6,219,145 | B1 | 4/2001 | Gutierrez et al. | |
| 8,643,846 | B2 * | 2/2014 | Santhanakrishnan | G01H 9/00 |
| | | | | 356/499 |
| 9,806,054 | B2 | 10/2017 | Wimplinger et al. | |
| 10,008,424 | B2 | 6/2018 | Wimplinger | |
| 2001/0015809 | A1 * | 8/2001 | Klein | G01H 9/00 |
| | | | | 356/502 |
| 2002/0167676 | A1 * | 11/2002 | Blouin | G01H 9/00 |
| | | | | 356/502 |
| 2005/0120803 | A1 | 6/2005 | Sokol et al. | |
| 2012/0157837 | A1 | 6/2012 | Nagata et al. | |
| 2013/0160552 | A1 | 6/2013 | Nakata et al. | |
| 2013/0228015 | A1 | 9/2013 | Wimplinger | |
| 2015/0369651 | A1 * | 12/2015 | Nakajima | G01H 9/002 |
| | | | | 73/655 |
| 2016/0103026 | A1 * | 4/2016 | Povazay | G01L 5/0047 |
| | | | | 73/800 |
| 2016/0336203 | A1 | 11/2016 | Lindner | |

FOREIGN PATENT DOCUMENTS

| | | |
|---|---|---|
| JP | 2015-166751 A | 9/2015 |
| WO | WO-1999/061866 | 12/1999 |
| WO | WO-2008/103209 A1 | 8/2008 |
| WO | WO-2011/093108 A1 | 8/2011 |
| WO | WO-2012/062343 A1 | 5/2012 |
| WO | WO-2013/091714 A1 | 6/2013 |
| WO | WO-2015/113641 A1 | 8/2015 |

* cited by examiner

METROLOGY DEVICE AND METROLOGY METHOD

FIELD OF THE INVENTION

The present invention relates to a metrology device for inspecting a substrate and a corresponding metrology method for inspecting a substrate.

BACKGROUND OF THE INVENTION

Purely acoustic measuring methods are used primarily in the prior art, with the aid of which a bonded substrate stack can be investigated with regards to the structure and/or faults thereof. For the most part, the entire substrate stack is placed into a liquid, particularly water, to couple in a sound signal.

In addition, electromagnetic measuring methods and plants also exist, with the aid of which one can measure a substrate stack. In this case, electromagnetic beams are introduced into the substrate stack and the reflection thereof is measured. One such method is disclosed in WO2012062343A1.

Wetting the substrate stack with liquid constitutes the greatest problem. Wetting of this type is undesirable for several reasons.

First, the substrate stack must also be dried after removal from the plant and second, liquid can penetrate into the boundary surface between the substrates.

The electromagnetic measuring methods have the disadvantage that the information is limited by the limited penetration depth of the electromagnetic beams. The beams penetrate only to a relatively short depth of the substrate stack, in particular owing to metallic components with high absorption. Furthermore, the reflected measured signal is severely weakened after exiting the substrate stack. Furthermore, for the most part scanning methods are used, that is to say methods in which the substrate stack completes a relative movement with respect to a sharply focused beam which is scanning the substrate stack. This relative movement is extremely time-intensive and therefore costly.

SUMMARY OF THE INVENTION

It is an object of the present invention to specify a metrology device and a metrology method, using which the investigation of substrate stacks takes place in a fast, dry, highly accurate, reliable and inexpensive manner.

This object is achieved with the features of the independent claim(s). Advantageous developments of the invention are specified in the dependent claims. All combinations of at least two features specified in the description, the claims and/or the figures also fall within the scope of the invention. When value ranges are specified, values lying within the limits mentioned should also be disclosed as limit values and be claimable in any desired combination.

It is the basic idea of the present invention in this case to carry out a, particularly simultaneous, loading of a substrate stack with sound waves and a first beam path of electromagnetic waves, particularly from different, preferably opposite, sides of the substrate stack. A measurement/analysis of the substrate stack, with regard to voids in particular, is enabled by means of a second beam path of the electromagnetic waves, which is not guided to the substrate stack and is in particular transmitted from a source simultaneously to the first beam path, and interference formation with the first beam path.

In other words, the invention in particular teaches a plant (i.e., device) and a method, in order to generate a three-dimensional image of a substrate stack by means of (ultra-) sound excitation and interference measurement.

The invention is suitable for measuring individual substrates which are not connected to a substrate stack. The measurement of substrate stacks is the preferred embodiment. Insofar as reference is made to substrate stacks or substrate stacks are described, the description should also apply for, particularly individual, substrates.

The substrates/substrate stacks may have any desired shape, but are preferably circular. The diameter of the substrates is in particular industrially standardized. For wafers, the industry-standard diameters are 1 inch, 2 inches, 3 inches, 4 inches, 5 inches, 6 inches, 8 inches, 12 inches and 18 inches. Further specific embodiments are rectangular substrates, so-called panels. The embodiment according to the invention may however fundamentally handle any substrate, independently of the diameter thereof. The substrate stacks built from the substrates have corresponding average diameters.

The average thickness of a substrate in particular lies between 5000 µm and 50 µm, preferably between 2500 µm and 100 µm, more preferably between 1500 µm and 200 µm, most preferably between 1000 µm and 500 µm, most preferably of all around 750 µm.

The invention particularly relates to a plant and a method for measuring a substrate stack, particularly for void detection. In the invention, this is preferably an acoustic-optical method. In the acoustic-optical method, a sound wave is coupled in, particularly over the entire surface, on a first substrate stack surface, the substrate stack fixing surface, of the substrate stack. The sound waves generated propagate through the substrate stack as far as the second substrate stack surface, the substrate stack measuring surface, which is opposite the first substrate stack surface. Locally different, in particular individually controllable, sound waves are preferably generated along the substrate stack surface.

A local change (particularly deformation and/or vibration) of the substrate stack measuring surface induced by the sound waves is detected by means of a plurality of partial beams of a previously generated and widened beam (first beam path). By preferably using an interferometer, a primary beam (second beam path) can be induced to overlay the reflected secondary beam (first beam path), particularly by means of parallelization. A two-dimensional interference pattern is created by means of the width of the beam, which interference pattern can be detected and recorded by a detector, particularly a CCD detector.

A multiplicity of interference images, which can be converted by means of mathematical algorithms into a three-dimensional image of the measured substrate stack, are created sequentially by means of the, particularly locally varying, ultrasound excitation. Voids in particular can be detected by means of the three-dimensional image.

According to the invention, a liquid bath can preferably be dispensed with. At most, a spatially delimited wetting of a flat side of the substrate stack takes place.

Punctiform scanning of the substrate stack is not necessary due to a detection carried out at least substantially in one step (that is to say without scanning the substrate stack) and/or over the entire surface.

The invention describes a plant and a method for destruction-free measurement, particularly of voids, of an object, particularly of a substrate stack. In the remainder of the published document, only a substrate stack will be spoken of.

The invention is comprised of a plurality of elements, described in the following, which may be considered and disclosed in themselves as an independent invention:
Sound Loading Means, Particularly Sound Sample Holders The sound loading means, particularly also constructed as a sound sample holder, is used for generating sound waves and loading the substrate stack with the sound waves generated. According to the invention, the sound waves are preferably ultrasound waves. According to the invention, the generation of mega-sound or infrasound waves is also conceivable. The transitions of the frequency ranges of the previously mentioned sound waves are fluent.

The preferred frequency range according to the invention for infrasound waves lies between 0.001 Hz and 16 Hz, preferably between 0.01 Hz and 16 Hz, more preferably between 1 Hz and 16 Hz, most preferably between 5 Hz and 16 Hz.

The preferred frequency range according to the invention for mega sound lies between 400 kHz and 2 MHz, preferably between 600 kHz and 2 MHz, more preferably between 1 MHz and 2 MHz, most preferably between 1.5 MHz and 2 MHz.

The preferred frequency range according to the invention for ultrasound lies between 16 kHz and 1 GHz, preferably between 100 kHz and 1 GHz, more preferably between 1 MHz and 1 GHz, most preferably between 500 MHz and 1 GHz.

In a general embodiment, the sound sample holder generates a vibration of between 0.0001 Hz and 1 GHz.

To generate an image of the 3D structure of the substrate stack, more than one frequency in particular is used, preferably an entire frequency band.

The sound loading means is preferably constructed in such a manner that it can generate the sound waves in a spatially resolved manner, particularly by providing a multiplicity of sound sources which are preferably arranged in an array, more preferably in a phased array. The individual sound sources are preferably punctiform. Punctiform sound sources of this type can be interconnected and/or focused by means of a corresponding circuit to form line sound sources, surface sound sources or pattern sound sources. In particular, the targeted generation of a specific sound wave front is possible by means of direct activation of the sound sources.

The sound loading means, particularly the sound sample holder, preferably includes a base body and a plurality of, in particular symmetrically arranged, sound sources. The sound sources are preferably arranged in a grid-shaped manner.

The sound sources may have any desired shapes. The cross section of the sound sources is in particular
rectangular, preferably square or
triangular or
hexagonal or
round.
The sound sources are in particular
electrical sound generators, particularly piezo elements and/or
hydraulic sound generators and/or
pneumatic sound generators and/or
magnetic sound generators and/or
capacitively activated membrane.
Piezo elements are preferably used according to the invention.

The sound sources are constructed to be individually controllable according to an advantageous embodiment of the invention. In particular, this creates the possibility of creating phase relationships between the emitted sound waves and/or sequences of various sound wave shapes.

In a very particularly preferred embodiment according to the invention, the sound sources are installed on or in the nubs of a flubbed sample holder. A nubbed sample holder is a special type of sample holder, in which the substrate, particularly the substrate stack, does not rest on the entire surface, but rather on a plurality of, particularly symmetrically distributed, elevations, the nubs.

A sample holder of this type is for example disclosed in the published document WO2015113641A1, to which reference is made in this respect.

The sound loading means, particularly the sound sample holder, preferably has coupling medium channels, via which a coupling medium can be introduced between the sound sources and the substrate stack. The coupling medium channels may be located at any desired position on the sound sample holder, but are preferably located at the edge or between the periphery and the sound sources, in order to not impair the arrangement of the sound sources, which are arranged in a grid-shaped manner. The coupling medium channels are preferably arranged symmetrically.

According to an advantageous embodiment, the sound loading means has a space for accommodating the coupling medium, which space can be closed by means of the substrate stack. The space is delimited by the sound generators opposite the substrate stack and by a peripheral web at the side.

According to a further embodiment according to the invention, the sound sample holder has fixing means, using which the substrate stack is or can be fixed on the sound sample holder. Preferably, the substrate stack is first fixed to the fixing means and the coupling medium is introduced after that. As a result, it is ensured that the substrate stack is fixed on the one hand, but on the other hand is optimally connected to the sound sources via the coupling medium. A previously introduced coupling medium would be distributed over the entire fixing surface and make difficult or even prevent fixing by means of the fixing means. The fixing means may be located at any desired position on the sound sample holder, but are preferably located at the edge, particularly below the substrate stack, in order to not impair the arrangement of the sound sources, which are arranged in a grid-shaped manner.

The fixing means are preferably arranged symmetrically.

The fixing means may be the following elements in particular:
vacuum fixings and/or
adhesive surface fixings, particularly switchable adhesive surface fixings, and/or
electrostatic fixings and/or
magnetic fixings and/or
mechanical fixings, particularly clamps.

The sound sample holder preferably has loading pins, using which the substrate stack can be loaded on the sound sample holder and unloaded. The loading pins may be located at any desired position on the sound sample holder, but are preferably located at the edge, in order not to impair the arrangement of the sound sources, which are arranged in a grid-shaped manner. The loading pins are preferably arranged symmetrically.

The sound sample holder is preferably designed as a translation stage or can be fixed on a translation stage. A relative movement can be executed between the sound sample holder and the optical system according to the invention, which is described below in detail (in particular constructed as a superstructure). The relative speed is in particular greater than 1 µm/s, particularly greater than 1 mm/s, more preferably greater than 1 cm/s. An increase in the resolution can be achieved by means of a relative movement between the sound sample holder and the optical structure, more precisely the measuring partial beam field. Scanning measurement is possible due to the possibility of a relative movement. In this case, the collected intensity information is connected at the detector to an x-y position of the sound sample holder. It would for example be conceivable to use a spatially focussed primary beam PB", which is not widened to the full size of the substrate stack. As a result, one only receives the information from a small part region of the substrate stack. The entire substrate stack can nonetheless be measured by means of a relative movement. 2D scanning methods of this type can entail the advantage of increased resolutions, but are naturally slower than the instantaneous/direct measurement of the entire substrate stack.

If one would like to dispense with relative movements completely and if whole-surface irradiation of the substrate stack is not used, then it is also possible to scan the substrate stack surface using a spatially delimited beam. To this end, the entire optical system is preferably designed for the scanning.

The sound loading means, particularly the sound sample holder, can be operated with continuous operation or with pulsed operation. Continuous operation is understood to mean the temporally sustained use of the sound sources without or with negligibly small interruption. Pulsed operation is understood to mean the one-time, particularly short-term, use of the sound sources, followed by a time interval of non-use of the sound sources. Pulsed operation is preferred according to the invention.

The sound loading means, particularly the sound sample holder, preferably the individual sound sources, operates or operate with pulsed operation in particular, particularly in a frequency range between 1 Hz and 0.1 MHz, preferably between 10 Hz and 10,000 Hz, more preferably between 25 Hz and 5000 Hz, most preferably between 50 Hz and 2500 Hz, most preferably of all between 100 Hz and 1000 Hz.

Coupling Medium (Optional)

A coupling medium layer made up of a coupling medium in particular is located between the sound sources and the first substrate stack surface during sound loading. The coupling medium is preferably introduced by means of coupling medium channels. The coupling medium covers the sound sources and the substrate stack surface to be loaded at least predominantly, preferably completely. The coupling medium may in particular be one or more of the following media:
- solids, and/or
- fluids, particularly
  - gases, preferably
    - pure gases or
    - gas mixtures, preferably air
  - liquids, particularly
    - pure liquids or
    - liquid mixtures
  - aerosols and/or
  - suspensions Water, particularly distilled water, is preferably used as coupling medium.

According to the invention, the thickness of the coupling medium layer is smaller than 5 mm, preferably smaller than 1 mm, more preferably smaller than 1 µm, most preferably smaller than 1 nm.

According to the invention, the thickness of the coupling medium layer is in particular at least as large as the sum of the roughnesses of the substrate stack fixing surface and the sound sample holder surface, particularly the sound source surfaces, which should be coupled to one another. The roughness is either specified as mean roughness, root mean square roughness or as mean roughness depth. The determined values for the mean roughness, the root mean square roughness and the mean roughness depth generally differ for the same measured distance or measured area, but lie in the same order of magnitude. The thickness of the coupling medium layer is therefore at least as large, particularly at least 2-times as large, more preferably at least 3-times as large, more preferably at least 5-times as large, most preferably at least 10-times as large as the sum of the roughnesses of the substrate stack fixing surface and the sound sample holder surface, particularly the sound source surfaces.

Alternatively, the thickness of the coupling medium layer is in particular chosen such that touching the substrate stack fixing surface and the sound sample holder surface is at least predominantly, preferably completely, prevented.

In a very particularly preferred embodiment, it is possible to dispense with the use of a coupling medium layer completely. That is preferably the case if the transmission of the sound waves from the sound sources and the first substrate stack surface takes place without any significant limitations, particularly loss in intensity or scattering. In particular, the fixing of the substrate or substrate stack will be so good that the contact between the sound source and the first substrate stack surface is maximized. That is the case in particular for vacuum fixings and smooth surfaces with little roughness.

Optical System

According to the invention, the optical system is comprised of a, particularly separate, source for the electromagnetic radiation, means for loading a substrate stack measuring surface of the substrate stack, interference means for forming interference radiation from the first and second beam paths and a detector for detecting the interference radiation.

A primary beam leaves the source for electromagnetic radiation as a source beam. The beam reflected by the substrate stack measuring surface, particularly modified by the vibration according to the invention of the substrate stack, is termed the secondary beam. The primary beam is in particular split by a beam splitter into a first beam path and a second beam path. Alternatively, the two beam paths can be output separately, particularly by two, preferably synchronously switched, sources. The first beam path is deflected/directed as measuring beam onto the substrate stack measuring surface and after reflection as secondary beam to the detector. Before impingement onto the detector, the secondary beam is joined with the second beam path/reference beam. In this case, interference of the primary and the secondary beams preferably occurs.

The optical system can be expanded by any desired other optical elements, which can be used for influencing, particularly deflecting, splitting, parallelizing, the primary and/or secondary beam or the first and/or second beam path. These primarily include one or more or a combination of one or more of the following optical elements:
- phase shift masks,
- micromirror arrays (DMDs),
- prisms,
- lenses, particularly
  - refractive lenses
    - geometric lenses, particularly convex lenses,
concave lenses,
convex-concave lenses,
diffractive lenses, particularly Fresnel lenses
mirrors, particularly
cold mirrors,
parabolic mirrors,
elliptical mirrors,
collimators.
beam splitters The following optical elements are preferably used according to the invention:
lenses
beam splitter mirrors In particular, lenses are used, in order to widen the diameter of the primary beam. It is particularly advantageous if the same lenses are used after the reflection of the primary beam for reducing the diameter of the secondary beam.

Refractive and/or Fresnel lenses are used according to the invention particularly for beam widening and/or beam compression.

Mirrors are preferably used as part of the interferometer, in order to bring about interference in beams over longer or shorter paths. Cold mirrors can be used in particular in order to filter infrared radiation so that the infrared radiation does not heat the substrate stack unnecessarily.

Collimators are preferably installed directly downstream of the source in order to ensure parallelization of the beam.

Source

The source is an electromagnetic source. The electromagnetic radiation can be completely incoherent or temporally and/or spatially coherent. The coherence length is in particular greater than 1 µm, preferably greater than 100 µm, more preferably greater than 1 mm, most preferably of all greater than 100 mm.

The source is preferably operated in pulsed mode. In pulsed mode, photons are not output continuously, but rather in a pulsed manner. The pulse times are in particular shorter than 1 s, preferably shorter than 1 ms, more preferably shorter than 1 µs, most preferably of all shorter than 1 ns.

The power of the source is in particular greater than 1 mW, preferably greater than 100 mW, more preferably greater than 1 W, most preferably greater than 100 W, most preferably of all greater than 1000 W.

The electromagnetic radiation, which is emitted by the source, preferably has a wavelength in the range between 10 nm and 2000 nm, preferably between 10 nm and 1500 nm, more preferably between 10 nm and 1000 nm, most preferably of all between 10 nm and 500 nm, most preferably of all between 10 nm and 400 nm. Particularly preferred wavelengths are 635 nm and 532 nm. White light sources, which emit electromagnetic radiation of an entire band length, are particularly preferably used. All optical elements and/or detectors used must then be designed for the white light sources.

Detector

The detector is in particular constructed as a flat panel detector. The flat panel detector is preferably a CCD detector. The detector particularly has a read frequency of between 1 Hz and 1 MHz, preferably between 10 Hz and 100000 Hz, more preferably between 20 Hz and 10,000 Hz, most preferably between 30 Hz and 1000 Hz, most preferably of all between 40 and 100 Hz. Here, one understands read frequency to mean the number of full interference images which the detector can read per second.

The horizontal pixel resolution of the detector is in particular more than 10 pixels/cm, preferably more than 100 pixels/cm, more preferably more than 1000 pixels/cm, most preferably more than 10000 pixels/cm, most preferably of all more than 100000 pixels/cm.

The vertical pixel resolution of the detector is in particular more than 10 pixels/cm, preferably more than 100 pixels/cm, more preferably more than 1000 pixels/cm, most preferably more than 10000 pixels/cm, most preferably of all more than 100000 pixels/cm.

The distance between two pixels in particular lies between 0.1 µm and 100 µm, preferably between 0.5 µm and 50 µm, more preferably between 1 µm and 25 µm, most preferably between 2.5 µm and 10 µm, most preferably of all 5 µm.

Preferred Embodiments

In all of the embodiments according to the invention, there is in particular the possibility of carrying out a relative movement between the optical system and the sound loading means and/or the sound sample holder. As the optical system is comprised of a plurality of parts or optical elements, an active movement of the sound sample holder is preferred.

The sound sample holder is preferably moved on a solid plate, particularly a granite plate. The solid plate is used for vibration damping. The optical system is in particular fixed relatively to or on the same solid plate. In a yet more preferred embodiment according to the invention, the optical system is fixed with respect to a second solid plate to the greatest possible extent, which is decoupled from the first solid plate, particularly completely. As a result, vibrations, which are brought about by the sound sample holder moving on the first solid plate, are optimally shielded.

In a first embodiment according to the invention, the plant (i.e., device) according to the invention at least comprises an, in particular coherent, electromagnetic source, a reference, a beam splitter, a detector, optical elements for widening and splitting the beams and a sound sample holder according to the invention.

The sound sample holder is fixed in this first embodiment according to the invention. A particularly rigid embodiment is possible by means of the fixing, without vibration possibly caused by the movement of the sound sample holder.

In a second embodiment according to the invention, the plant according to the invention at least comprises an, in particular coherent, electromagnetic source, a reference, a beam splitter, a detector, optical elements for widening and splitting the beams and a movable sound sample holder.

In the second embodiment according to the invention, the sound sample holder can carry out a relative movement with respect to the optical system. Due to the option of moving the sound sample holder over an, in particular solid, plate, scanning of the part regions between the partial beams, which are crated by the lens field, is enabled.

Processes

In a first embodiment of the process according to the invention, the detection/measurement of the substrate stack takes place as follows, wherein the individual process steps are disclosed as independent steps of the invention.

In a first process step, a substrate stack is loaded onto the sound sample holder. The loading preferably takes place fully- or semi-automatically using a robot or manually. If the sound sample holder has loading pins, which are preferably present, the substrate stack is placed onto the loading pins and lowered onto the fixing surface of the base body by lowering the loading pins. If the sound sample holder does not have any loading pins, the substrate stack is placed directly on the fixing surface.

In an optional second process step, fixing of the substrate stack takes place by means of fixing means. Vacuum inlets are preferably used for fixing, which are particularly integrally incorporated in the sound sample holder. A relatively simple fixing, in particular carried out on the underside of the substrate stack, takes place by means of the vacuum inlets. In this case, the fixing takes place in a punctiform manner in particular, so that a coupling medium can still be introduced between the sound sample holder and the substrate stack. In a very particularly preferred embodiment, the substrate stack fixing surface and the fixing surface of the sound sample holder are so flat that it is possible to dispense completely with a coupling medium for efficient sound transmission.

In a further, optional third process step, the coupling medium is introduced between the substrate stack and the sound sources, particularly into a space formed by the shape of the sound sample holder. The coupling medium is preferably introduced through coupling medium channels which are in particular constructed integrally in the sound sample holder. The introduction of the coupling medium via a separate, external feed means, such as for example a hose, a syringe or a nozzle, is also conceivable.

The sequence of the second and the third process steps can be swapped or carried out simultaneously at least to some extent. In particular, it may be advantageous to first apply the coupling medium onto the fixing surface, then to place the substrate stack and only then to carry out the fixing, if desired and/or necessary.

In a fourth process step, a sound source pattern generated by the sound sources or a sequence of different sound source patterns is coupled into the substrate stack, particularly through the coupling medium. The sound source pattern or the sequence of sound source patterns is preferably pre-programmed in a soft- and/or hard- and/or firmware. In a very particularly preferred embodiment according to the invention, software is provided, which allows any desired programming of the sound sources and thus of one or more sound source patterns. The software should be user-friendly, have an appropriate graphical user interface and allow programming of the sound sample holder, which is as simple as possible, particularly by means of graphical elements. In particular, it should be possible for each sound source to specify individually the time at which it outputs a sound signal and the power with which this sound signal is output. In a preferred embodiment, various sound source patterns can be generated and stored. The software activates the individual sound sources of the sound sample holder at one or a plurality of defined trigger time(s) and thus generates a plurality of sound signals. The thus generated sound signals join/overlay one another to form a, particularly inhomogeneous, sound front.

The sound front is coupled into the substrate stack in a fifth process step, particularly via the coupling medium, and propagates through the same. As the speed of sound in various materials is different and the sound front runs through a substrate stack which is at least somewhat inhomogeneous, particularly at voids, the sound wave front is changed/deformed on the way to the substrate stack measuring surface, particularly locally. The deformation of the sound wave front means the same as the statement that different parts of the sound wave front arrive at the substrate stack measuring surface at different times. As soon as a part of the sound wave front impinges on the substrate stack measuring surface, it excites the environment to form a vibration. This vibration in turn influences the electromagnetic beams of the first beam path when the same impinges onto the substrate measuring surface.

In a sixth process step, the electromagnetic radiation is generated or transmitted by the source simultaneously to the generation or coupling of the sound wave front into the substrate stack in particular. The electromagnetic radiation is widened, broken down by a beam splitter and to some extent reflected onto a reference (second beam path). The beam not reflected onto the reference (first beam path) is widened on its way to the substrate stack measuring surface and broken down into partial beams by means of a lens field.

The individual partial beams are reflected back differently locally, particularly in a temporally offset manner, to the beam splitter due to the respective local vibration state of the substrate stack measuring surface. There, there is overlaying/(re)joining of the split beams. The thus-generated interference pattern is recorded at the detector.

Preferably, a plurality of interference images are recorded within a predefined time interval for each, particularly sequentially, induced sound signal. The process steps four to six according to the invention are repeated for different sound signals, particularly at least once, preferably at least twice, more preferably at least four times. The recording of a plurality of interference images during the fading of a sound signal coupled once into the substrate stack is also conceivable.

In a last/seventh process step, the stored interference images can be analysed, in order to identify possible voids.

The unloading of the substrate stack takes place in a last, eighth process step according to the invention.

Different filters can be installed in all optical paths. Half-shade filters and/or polarisation filters are used in a preferred embodiment. Furthermore, filters for complete interruption of the optical path can be installed, in order to obtain a simpler demarcation of the interference images to be analysed by means of sequential switching on and off of individual beam paths. All other filters known to the person skilled in the art, which fulfil the expedient properties, are also conceivable.

The invention can either be used as a stand-alone module or as a module in a cluster. If the invention is used as a stand-alone module, then in particular a separation of production or processing of the substrate stack on the one hand and measurement of the substrate stack on the other hand can be carried out. As a result, it becomes possible to build a process chain over a plurality of countries, in which the substrate stack is produced in one country and measured in a different country. If the embodiment according to the invention is part of a cluster, then production of the substrate stack and the measurement thereof can be carried out at the same site. As a result, it becomes possible in particular to detect potential faults in the production of the substrate stack in good time, in order to supply the substrate stack to a correction process.

In particular, a cluster of this type may have one or a plurality of the following modules:
   a metrology plant according to the embodiment according
      to the invention
   bonders
   debonders, particularly
      a plant for separating a pre-bond, particularly
   WO2013091714A1 coating plant, particularly
      spin coating plant
      spray coating plant
      PVD plant
      CVD plant developers
cleaning plant
plasma plant
sputtering plant
alignment plant
printing plant.

Insofar as features according to the invention imply or describe method features, these should be considered as disclosed according to the method and vice versa.

Further advantages, features and embodiments of the present invention result from the following description of the figures and the patent claims and the associated figures.

BRIEF DESCRIPTION OF THE DRAWINGS

In the figures, the same components or components with the same function are labelled with the same reference numbers.

DETAILED DESCRIPTION OF THE INVENTION

Figure 1A:
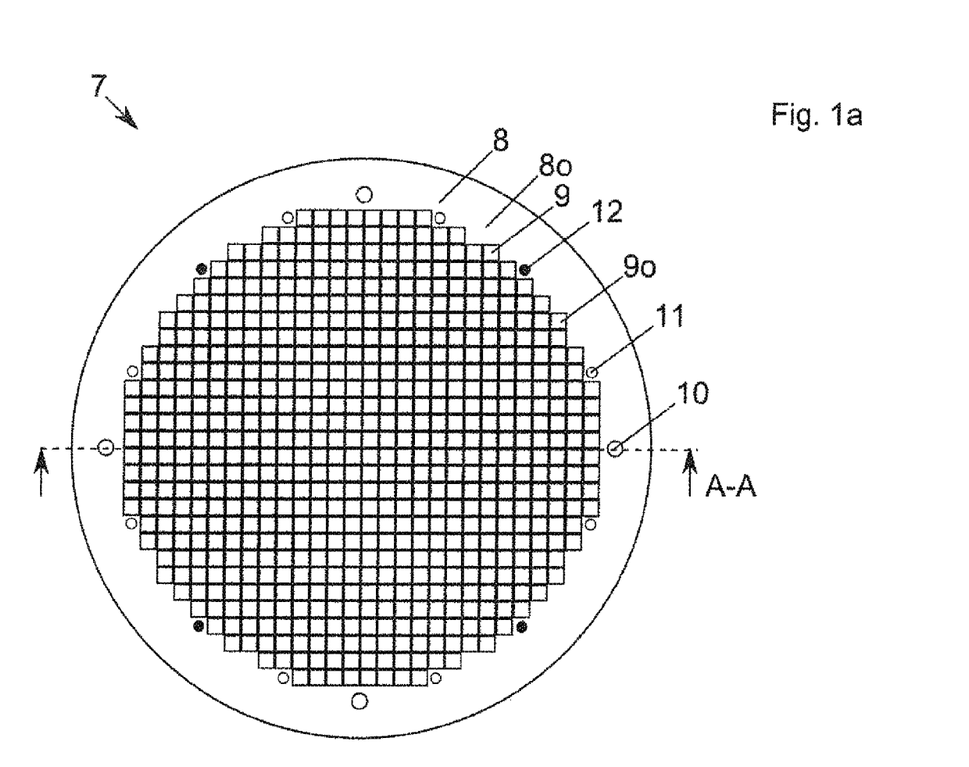
FIG. 1a shows a schematic view from above of a first embodiment of a sound sample holder according to the invention.

FIG. 1a shows a schematic view from above of a first embodiment according to the invention of a sound sample holder 7 (sound loading means), consisting of a plurality of individual sound sources 9, which are arranged in a grid-shaped manner in particular. A base body 8 of the sound sample holder 7 has a completely flat (i.e. flat up to the side edge) base body surface 8o. In the base body 8 there are preferably a plurality of coupling medium channels 10 and/or fixing means 11 and/or loading pins 12, which in particular penetrate the base body 8.

Any desired distribution of the coupling medium channels 10 and/or fixing means 11 and/or loading pins 12 over the base body surface 8o would also be conceivable, that is to say even between the sound sources 9. Preferably, the coupling medium channels 10 and/or fixing means 11 and/or loading pins 12 are attached peripherally however, in order to obtain a seamless/uninterrupted field of sound sources 9.

Figure 1B:
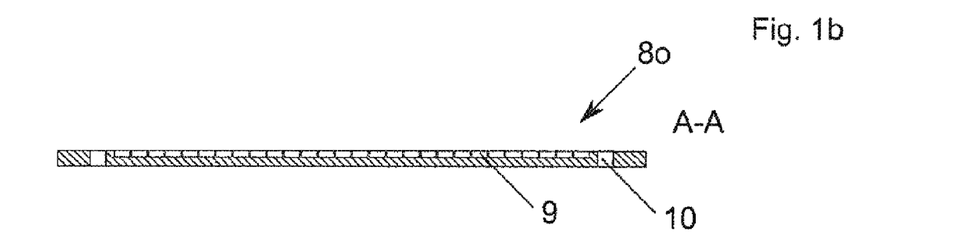
FIG. 1b shows a schematic cross-sectional view of the first embodiment.

FIG. 1b shows that sound source surfaces 9o of the sound sources 9 are preferably arranged flush with the base body surface 8o, particularly incorporated into the base body surface 8o and constructed integrally with the same.

Figure 2A:
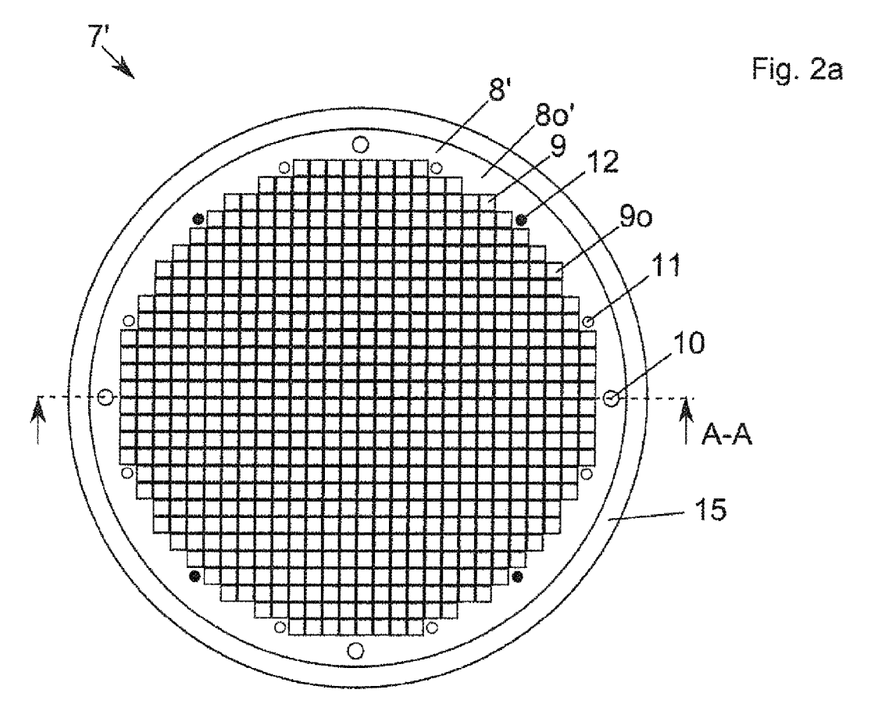
FIG. 2a shows a schematic view from above of a second embodiment of the sound sample holder according to the invention.

FIG. 2a shows a schematic view from above of a second, preferred embodiment according to the invention of a sound sample holder 7', consisting of a plurality of individual sound sources 9, which are in particular arranged in a grid-shaped manner. A base body 8' has a base body surface 8o', which has a base 8b and a web 15 encompassing the base 8b at the side, particularly completely peripherally. The base body 8' thus particularly forms a space for accommodating a coupling medium 13. The coupling medium 13 can be supplied via the coupling medium channels 10, particularly controlled by the control device.

In the base body 8' there are preferably a plurality of coupling medium channels 10 and/or fixing means 11 and/or loading pins 12. Any desired distribution of the coupling medium channels 10 and/or fixing means 11 and/or loading pins 12 over the base body surface 8o' would also be conceivable, that is to say even between the sound sources 9. Preferably, the coupling medium channels 10 and/or fixing means 11 and/or loading pins 12 are attached peripherally however, in order to obtain a seamless field of sound sources 9. Preferably, the coupling medium channels 10 and/or fixing means 11 and/or loading pins 12 are arranged between the web 15 and the sound sources 9.

The task of the web 15 includes keeping an, in particular liquid, coupling medium, which is introduced via the coupling medium channels 10, on the base body surface 8o'.

Figure 2B:
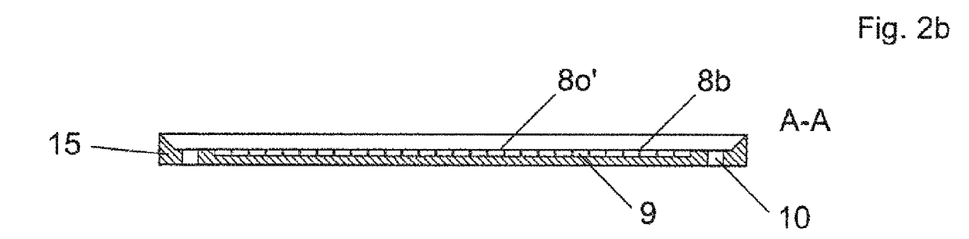
FIG. 2b shows a schematic cross-sectional view of the second embodiment.

FIG. 2b shows that sound source surfaces 9o of the sound sources 9 are preferably arranged flush with the base body surface 8o' and/or flush with the base 8b, particularly incorporated into the base body surface 8o' and constructed integrally with the same.

Figure 3:
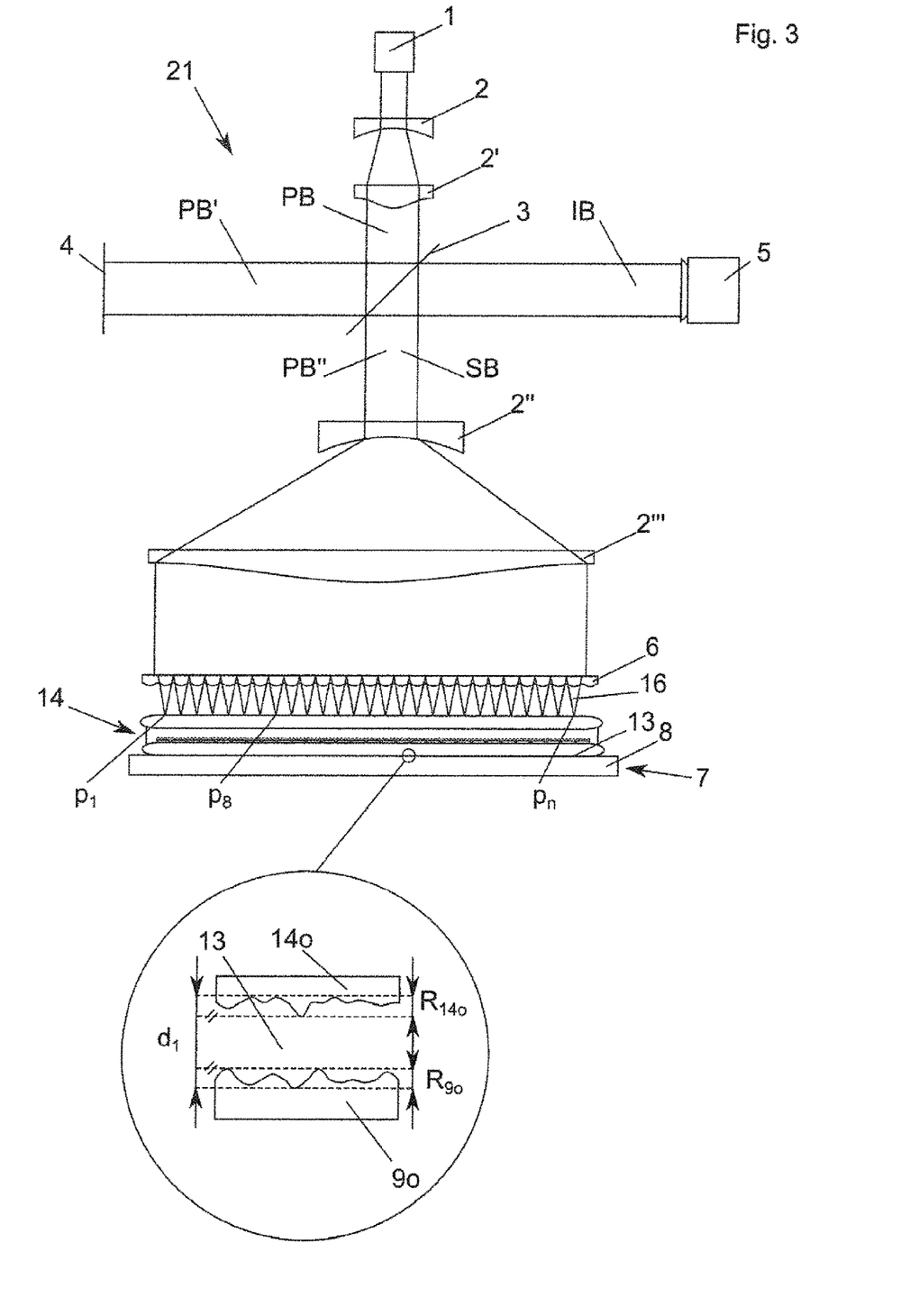
FIG. 3 shows a schematic side view of an embodiment of a plant/device according to the invention with an enlarged detail, FIG. 4 a schematic view of an interference pattern at a time t1.

FIG. 3 shows an embodiment of a plant 21 (device) according to the invention. The plant has a, particularly coherent, source 1. The source 1 is constructed for outputting an electromagnetic radiation, wherein the output is controlled by a control device (not illustrated). The plant 1 is constructed in such a manner that the electromagnetic radiation is partially deflected onto a substrate stack measuring surface 14m of the substrate stack 14. To this end, the substrate stack 14 is in particular arranged and fixed on the sound sample holder 7 on a substrate stack fixing surface 14o opposite the substrate stack measuring surface 14m.

The electromagnetic radiation should be guided as primary beam PB to an, in particular semi-transparent, beam splitter 3 for splitting the primary beam PB into a first beam path and a second beam path. To this end, it is advantageous if the primary beam PB is optimized for the splitting. A plurality of optical elements, which parallelize and/or broaden (enlarge the diameter of) the primary beam PB of the source 1, are preferably located between the source 1 and the beam splitter 3. These particularly include collimators (not illustrated) and/or lenses 2, 2'.

The primary beam PB, which is as parallelized as possible, then impinges onto the beam splitter 3, which breaks down/splits the primary beam into two partial beams, namely a reflected and deflected (by 90° in particular) reference beam PB' (second beam path) and a transmitted measuring beam PB" (first beam path).

The plant 21 has at least one reference 4. The reference 4 is preferably a flat mirror. The task of the reference 4 includes reflecting back the (parallel) reference beam PB' onto the beam splitter 3, particularly at least predominantly, preferably completely. The back-reflected reference beam PB' again impinges onto the beam splitter 3, wherein the back-reflected reference beam PB' is, in turn, split into a transmitted partial beam and a deflected partial beam. In a particular embodiment according to the invention, the reference 4 may be located in the beam path of the measuring beam PB". Interferometers of this type are termed "distal integrated interferometers".

The measuring beam PB" transmitted through the beam splitter 3 is preferably broadened again by means of a plurality of optical elements, particularly to the size of the substrate stack 14 to be measured. A lens field 6 is preferably located between the optical elements, particularly lenses 2''', used therefor and the substrate stack 14. The lens field 6 focusses parts of the measuring beam PB" onto the substrate stack measuring surface 14*m* facing the lens field and in particular arranged parallel to the lens field 6. Each lens of the lens field 6 therefore generates the partial beam 16, which detects a measuring point on the substrate stack measuring surface 14*m*.

The radiation reflected by the substrate stack measuring surface 14*m* makes it back to the beam splitter 3 as secondary beam SB changed in terms of properties, particularly shape, and influenced by the sound waves of the sound sample holder. At the beam splitter, interference is brought about in the reference beam PB' and the secondary beam SB. The plant 1 is therefore constructed such that the running times of the first and second beam path match, so that the same come back to the beam splitter 3 at the same time.

A detector 5 records the interference images in an analysable, particularly digitized, form. Preferably, the detector 5 is constructed as a flat panel detector, more preferably as a CCD flat panel detector.

FIG. 3 shows an enlargement of the point of intersection between the substrate stack fixing surface 14*o* and the sound source surfaces 9*o*, which particularly run flush or form a sound source plane. The sound source surfaces 9*o* correspond to the fixing surface 8*o* (or the fixing surface 8*o*' if using the sound sample holder 7' according to FIG. 2).

The roughnesses $R_{14o}$ and $R_{9o}$ must be smaller in sum than the distance d1, so that the coupling medium can couple the substrate stack fixing surface 14*o* optimally and above all completely with the sound source surface 9*o*. The distance d1 is the path between the deepest position of the sound source surfaces 9*o* and the deepest position of the substrate stack fixing surface 14*o*.

Alternatively, the thickness of the coupling medium layer is in particular chosen such that touching the substrate stack fixing surface and the sound sample holder surface is at least predominantly, preferably completely, prevented.

Figure 4:
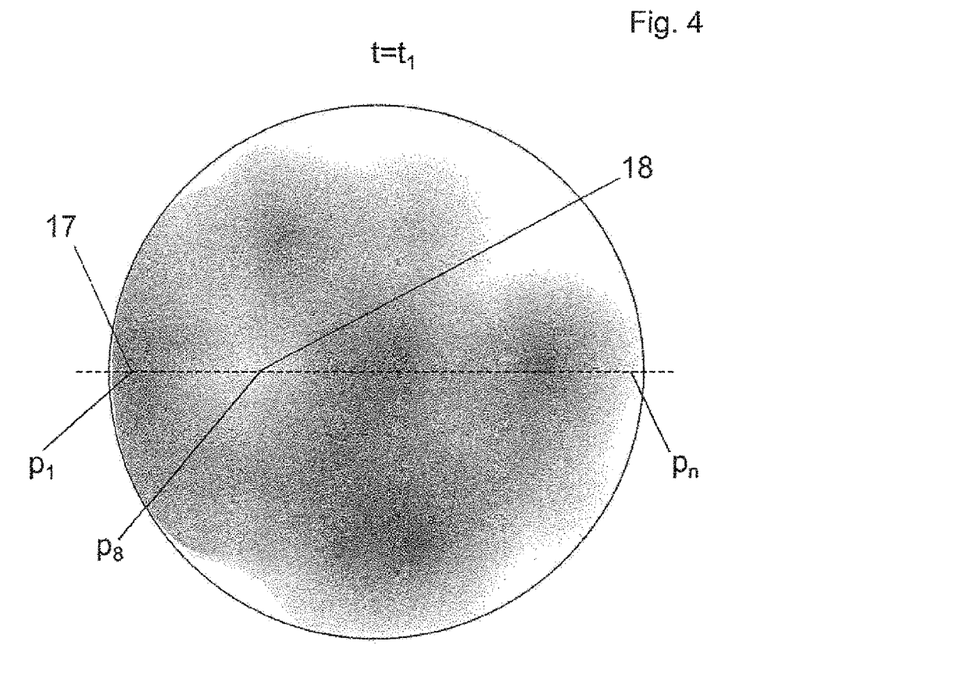

The FIG. 4 shows a schematic interference image recorded at the detector 5 at a time t1. Maxima 17 and minima 18 can be seen. At time t1, the point p1 on the substrate stack measuring surface 14*m* is currently passing the maximum 17, whilst the point p8 is passing the minimum 18 at the same time. The point Pn is passing the zero crossing. The contrast between minimum and zero crossing is difficult to illustrate and cannot be seen easily.

A plurality of such interference images are recorded for each induced sound signal over a time interval Δt. The number of recorded interference images per time interval Δt is termed the sampling rate. The sampling rate is in particular equal to 1, preferably greater than 5, more preferably greater than 10, most preferably greater than 20, most preferably of all greater than 100.

Figure 5:
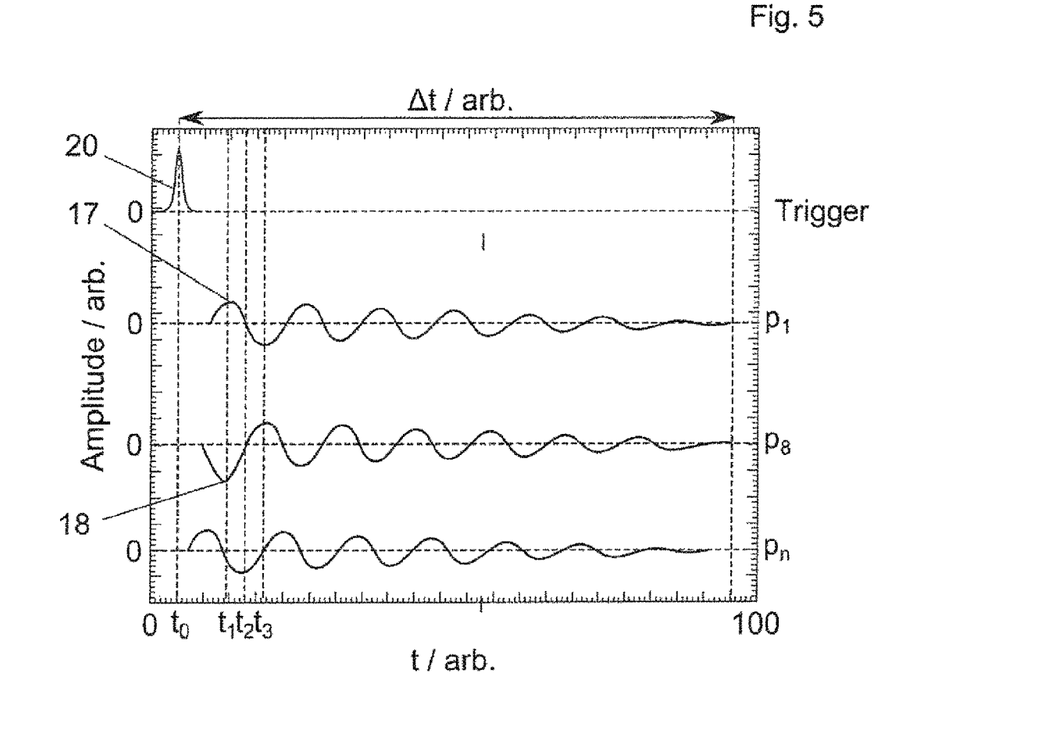
FIG. 5 shows a schematic illustration of the temporal change of the amplitude of three different points on the surface.

The FIG. 5 shows a graph with four different curves. The abscissa is time-scaled. The scale of the time scales preferably lies in the millisecond range, preferably in the microsecond range, most preferably in the nanosecond range. The first curve is the trigger curve. The trigger curve includes a trigger signal 20, which specifies the time t0 at which the sound sample holder couples sound waves 19 of the sound sources 9 into the substrate stack 14 via the coupling medium 13. The start of the time interval Δt is also simultaneous.

The three other curves represent the measured amplitude curves at the three points p1, p8 and pn of the substrate stack measuring surface 14*m*. One sees that the amplitudes of the individual points at a time t1 may differ in amount and sign. The vibration therefore differs in terms of amplitude and phase from point to point.

The FIGS. 6*a-d* show the temporal course by way of the example of point p1 of the vibrating substrate stack measuring surface 14*m* in the three states of the amplitude maximum, the amplitude zero crossing and the amplitude minimum. The sound wave 19 is illustrated schematically in FIG. 6*a*, which makes it as part of the sound wave front to the substrate stack measuring surface 14*m*.

Figures 6A, 6B, 6C, 6D:
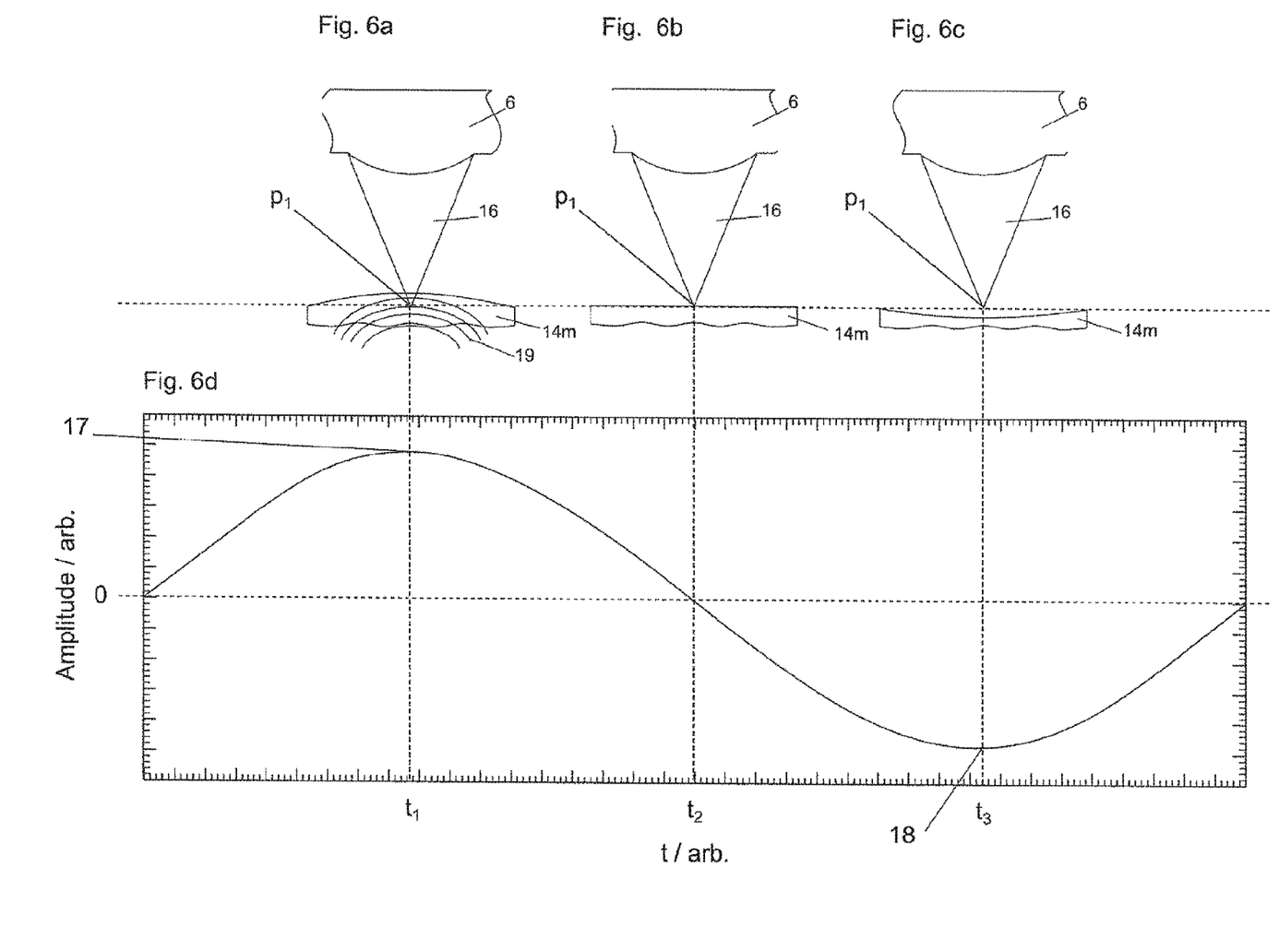
FIG. 6a shows a schematic, enlarged illustration of a vibrating point on the surface at the vibration maximum thereof.
FIG. 6b shows a schematic, enlarged illustration of the vibrating point on the surface at the vibrational zero-point crossing thereof.
FIG. 6c shows a schematic, enlarged illustration of the vibrating point on the surface at the vibration minimum thereof.
FIG. 6d shows a schematic illustration of the amplitude change of the point on the surface.

In FIGS. 6*b-c*, one then sees two further states of a complete vibration iteration. The amplitude curve of the FIGS. 6*a-c* is illustrated in FIG. 6*d*.

FIG. 6*a* shows a schematic, enlarged view of a point to be measured on the substrate stack measuring surface 14*m* in a state, in which the sound wave 19 arriving from the substrate stack fixing surface 14*o* causes a local, convex deformation/expansion of the substrate stack measuring surface 14*m*. Due to this expansion, the photons of the partial beam 16 reach the substrate stack measuring surface 14*m* sooner than in the cases according to FIG. 6*b* and FIG. 6*c* mentioned below. Due to the early backscattering, these photons reach the beam splitter 3 earlier and correspondingly interfere with the reflected reference beam PB' (second beam path).

FIG. 6*b* shows a schematic, enlarged view of a point to be measured on the substrate stack measuring surface 14*m* in a state, in which the local substrate stack measuring surface 14*m* has not been expanded.

FIG. 6*c* shows a schematic, enlarged view of a point to be measured on the substrate stack measuring surface 14*m* in a state, in which the sound wave 19 arriving from the substrate stack fixing surface 14*o* causes a local, concave deformation/expansion of the substrate stack measuring surface 14*m*. Due to this expansion, the photons of the partial beam 16 reach the substrate stack measuring surface 14*m* later than in the already cited cases according to FIG. 6*a* and FIG. 6*b*. Due to the delayed backscattering, these photons reach the beam splitter 3 later and correspondingly interfere with the reflected reference beam PB' (second beam path).

FIG. 6*d* shows a complete amplitude vibration at point p1 of the substrate stack measuring surface 14*m*.

Figure 7:
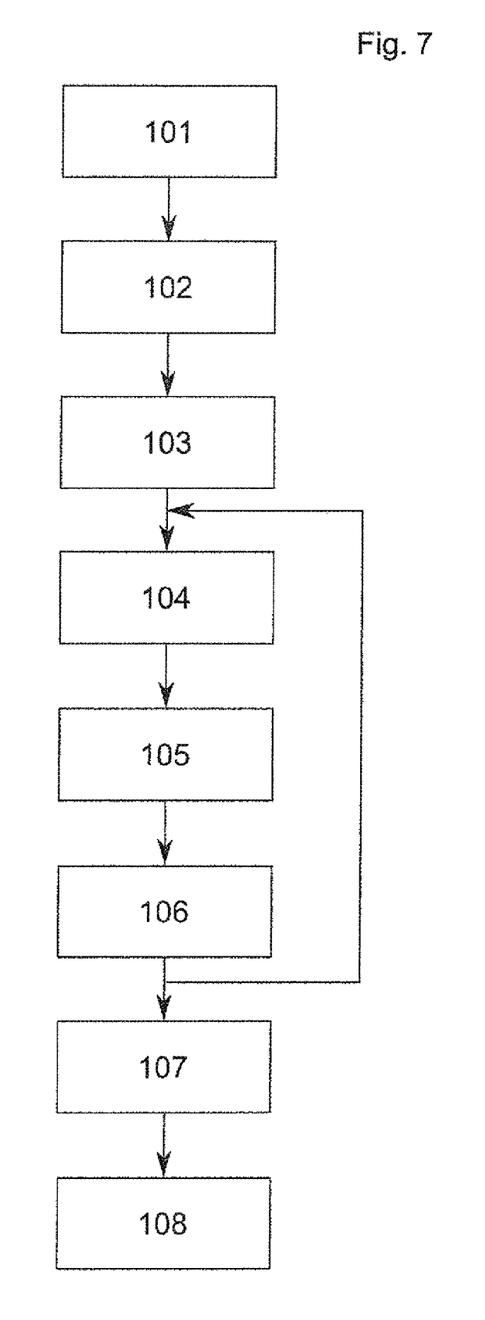
FIG. 7 shows a flow chart of a process according to the invention.

FIG. 7 shows a flow chart of a process according to the invention. In a first process step 101 according to the invention, the substrate stack 14 is loaded onto the sound sample holder 7, 7'. If loading pins 12 are present, the loading preferably takes place by placing the substrate stack 14 onto the extended loading pins 12. The substrate stack 14 can be loaded manually or automatically, particularly by means of a robot.

In an optional, second process step 102 according to the invention, the substrate stack 14 is fixed on the sound sample holder 7, 7'. The fixing takes place using the fixing means 11 provided therefor.

In a further, third process step 103 according to the invention, the coupling medium 13, is applied to the fixing surface 8o, 8o' of the base body 8, 8', particularly by means of the coupling medium channels 10. In this case, the coupling medium 13 penetrates into the boundary surface between the substrate stack fixing surface 14o and the fixing surface 8o, 8o' and thus generates a boundary layer, which is used as acoustic contact between the sound sample holder 7, 7' and the substrate stack 14.

In a fourth process step 104 according to the invention, a sound source pattern is generated in the sound sample holder 7, 7' according to the invention. In particular, the generation takes place by means of individual activation of the sound sources 9. The sound sources 9 are controlled by means of a hard- and/or soft- and/or firmware and emit individual sound sources with a defined amplitude and phase. By overlaying the individual sound source signals, a sound wave front according to the invention is created, which penetrates into the substrate stack 14.

In a fifth process step 105 according to the invention, the sound wave front passes the substrate stack 14 and is changed in the process by means of the inhomogeneities occurring in the substrate stack 14. The speed of sound is primarily dependent on the material, through which the sound is passing. The sound wave front is changed on its way to the substrate stack measuring surface 14m, if appropriate multiple times, by the various materials, particularly also by voids. As soon as the sound wave front arrives at the substrate stack measuring surface 14m, the sound wave front excites the same to vibrate. The vibrations are locally different due to the inhomogeneous sound wave front. In particular, it is possible by means of the design according to the invention to measure substrate stacks which are non-transparent for electromagnetic radiation. Infrared radiation is preferably used, in order to radiograph silicon substrates, but it does not penetrate metals. By using sound waves, all types of materials can readily be irradiated, particularly metals, ceramics, polymers, glasses, semiconductors, etc.

In a sixth process step 106 according to the invention, the measurement of the substrate stack measuring surface 14m takes place by means of interference. In particular, the emission of the electromagnetic radiation can be triggered with the activation of the sound sources 9. As light propagates many times faster than sound, it is ensured that the electromagnetic radiation is at the substrate stack measuring surface 14m before the sound waves entering at the substrate stack fixing surface 14o arrive there. The fifth process step is therefore controlled simultaneously with or only slightly time-delayed with respect to the fourth process step.

The electromagnetic radiation is generated in the source 1. A plurality of optical elements, particularly two optics 2 and 2', generate a widened primary beam PB. The widened primary beam PB impinges onto a beam splitter 3 and is broken down into a reflected reference beam PB' (second beam path) and a transmitted measuring beam PB" (first beam path). The reflected reference beam PB' is in turn reflected back by the reference 4, particularly a mirror, to the beam splitter 3, where it interferes with the secondary beam SB.

The transmitted measuring beam PB" is widened again by means of further optical elements, particularly two optics 2" and 2'", particularly to the size of the substrate to be measured. After the renewed widening, the transmitted measuring beam PB" is broken down by means of a lens field 6 into partial beams 16 focussed onto the substrate stack measuring surface 14m. The partial beams 16 are reflected at different times depending on the topography of the substrate stack measuring surface 14m and therefore get back to the beam splitter 3 with different time differences.

After reflection, the return of the secondary beam SB carrying the vibration information to the beam splitter 3 therefore occurs. There, the secondary beam SB interferes with the reference beam PB' reflected by the reference 4 to form interference beam IB. The interference beam IB is detected by the detector 5. An interference pattern is created at the detector 5. The interference pattern recorded at the detector 5 represents the topography of the substrate stack measuring surface 14m, in particular encoded as a phase map at a defined time t.

After a finite time interval $\Delta t$, damped vibrations come to a state in which the amplitude is so low that one can speak of the end of the vibration. According to the invention, all interference patterns are measured for a predetermined time interval $\Delta t$ for each induced sound pattern.

By means of this measuring process according to the invention, the information for the vibration of the topography of the substrate stack measuring surface 14m, which can be generated using an induced sound pattern, is available.

The process steps 104 to 106 according to the invention are repeated several times, particularly using different sound patterns. The sequence of measured interference patterns within a time interval $\Delta t$ is uniquely assigned to the sound pattern which created it.

In a seventh process step 107 according to the invention, the sound patterns and the interference images are used in order to calculate the structure of the substrate stack 14.

The unloading of the substrate stack 14 takes place in an eighth process step 108 according to the invention.

The process steps 107 and 108 may also take place in parallel or swapped with one another.

REFERENCE NUMBERS

1 Source
2, 2', 2", 2'" Lenses
3 Beam splitter
4 Reference
5 Detector
6 Lens field
7, 7' Sound sample holder
8, 8' Base body
8o, 8o' Base body surface
9 Sound sources
9o Sound source surface
10 Coupling medium channel
11 Fixing means
12 Loading pins
13 Coupling medium
14 Substrate stack
14o Substrate stack fixing surface
14m Substrate stack measuring surface
15 Web
16 Partial beams
17 Amplitude or phase maximum
18 Amplitude or phase minimum
19 Sound wave
20 Trigger signal
21 Plant
d1 Coupling medium layer thickness
$R_{9o}$ Sound source surface roughness
$R_{14o}$ Substrate stack surface roughness
PB, PB', PB" Primary beam
SB Secondary beam
IB interference beam Having described the invention, the following is claimed:

1. A metrology device for inspecting a substrate stack, said metrology device comprising:
   sound application means for applying sound waves to a first substrate stack surface of the substrate stack;
   an optical system having:
   a source for outputting electromagnetic radiation, which is split into at least one first beam path and one second beam path;
   means for applying the first beam path onto a substrate stack measuring surface of the substrate stack;
   interference means for forming an interference radiation made up of the first and second beam paths of the electromagnetic radiation; and
   a detector for detecting the interference radiation,
   wherein the sound application means and the optical system are located on opposite sides of the substrate stack.

2. The device according to claim 1, wherein the interference means comprises a beam splitter for splitting the electromagnetic radiation into the first and second beam paths and forming the interference radiation made up of the first and second paths of the electromagnetic radiation.

3. The device according to claim 1, wherein the sound application means includes sound loading means having one or more separately controllable sound sources for generating the sound waves.

4. The device according to claim 3, wherein the sound loading means further comprise fixing means for fixing the substrate stack along a sound source surface of the sound sources.

5. The device according to claim 3, wherein a coupling medium is introduced between the sound loading means and the first substrate stack surface.

6. A metrology method for inspecting a substrate stack, said method comprising:
   applying sound waves to a first substrate stack surface of the substrate stack using sound application means;
   outputting electromagnetic radiation from a source;
   splitting the electromagnetic radiation into at least one first beam path and one second beam path;
   applying the first beam path to a substrate stack measuring surface of the substrate stack;
   forming interference radiation made up of the first beam path and the second beam path of the electromagnetic radiation; and
   detecting the interference radiation at a detector,
   wherein the sound application means and the source are located on opposite sides of the substrate stack.

7. The method according to claim 6, wherein the first beam path is set in such a manner that the substrate stack measuring surface is captured completely by the first beam path.

8. The method according to claim 6, wherein the splitting of the first and second beam paths is performed by a beam splitter so as to generate the first and second beam paths simultaneously.

9. The method according to claim 6, wherein the second beam path is reflected on a reference after the splitting, and
   wherein the forming of the interference radiation comprises joining the first and second beam paths after reflection of the applied first beam path at the substrate stack measuring surface and the reflection of the second beam path on a reference after the splitting.

10. The method according to claim 6, wherein the sound waves are applied by loading the substrate stack with sound waves generated by one or more separately controllable sound sources.

11. The method according to claim 6, wherein the application of sound waves comprises coupling a sound source pattern generated by a sequence of different sound patterns into the substrate stack, and
    wherein said interference radiation is detected for each of said sound patterns.

* * * * *